United States Patent [19]

Aoyama

[11] Patent Number: 4,499,870

[45] Date of Patent: Feb. 19, 1985

[54] MULTI-CYLINDER INTERNAL COMBUSTION ENGINE

[75] Inventor: Shunichi Aoyama, Yokosuka, Japan

[73] Assignee: Nissan Motor Company, Limited, Yokohama, Japan

[21] Appl. No.: 488,688

[22] Filed: Apr. 26, 1983

[51] Int. Cl.³ .............................................. F02D 13/06
[52] U.S. Cl. ................... 123/198 F; 123/90.16
[58] Field of Search .............. 123/198 F, 90.15, 90.16, 123/90.17

[56] References Cited

U.S. PATENT DOCUMENTS

| 4,182,289 | 1/1980 | Nakajima et al. | 123/90.15 |
| 4,253,434 | 3/1981 | Takizawa et al. | 123/90.15 |
| 4,353,334 | 10/1982 | Neitz | 123/90.16 |
| 4,354,460 | 10/1982 | Mae et al. | 123/90.16 |
| 4,384,556 | 5/1983 | Ohlendorf et al. | 123/198 F |
| 4,399,784 | 8/1983 | Foley | 123/90.18 |
| 4,401,069 | 8/1983 | Foley | 123/90.18 |

Primary Examiner—Ira S. Lazarus
Attorney, Agent, or Firm—Schwartz, Jeffery, Schwaab, Mack, Blumenthal & Koch

[57] ABSTRACT

The present invention relates to a multi-cylinder internal combustion engine which may be used for the automobile and the like. The multi-cylinder internal combustion engine comprises at least one cylinder which can be rendered inoperative while the rest of cylinders are operating and a controlling means for closing the intake valve of the cylinder in the inoperative mode and for opening the exhaust valve of the same cylinder on the exhaust and intake strokes.

6 Claims, 12 Drawing Figures

MULTI-CYLINDER INTERNAL COMBUSTION ENGINE

BACKGROUND OF THE INVENTION (1) Field of the Invention

The present invention relates to a multi-cylinder internal combustion engine which is adapted to keep some of the cylinders thereof inoperative while the rest of them are operating when the magnitude of the load on the engine decreases.

(2) Description of the Prior Art

In a motor vehicle such as an automobile and the like, all cylinders of a multi-cylinder engine must be operated simultaneously to provide sufficient output power for driving under a heavy load condition. It, however, is often experienced that if all the cylinders are continued to operate simultaneously even after the engine load becomes small, that is, during a partial load condition, each cylinder tends to reduce its charging efficiency, resulting in increased pumping loss and decreased combustion efficiency and fuel economy.

To overcome such shortcomings, several new solutions are already proposed in the prior art, as described, for instance, in the Japanese Patent Application No. 288770/1975 wherein some cylinders are made inoperative under a partial load condition on the engine. This enables a concentrated fuel-air mixture to enter the rest of cylinders, thereby providing a consequential improvement in the fuel/milage ratio as a result of increased combustion efficiency and reduced pumping loss. Some cylinders, in such prior art, can be made inoperative by retaining their intake valve and exhaust valve in completely closed positions, thus interrupting further inflow of the fuel-air mixture to the cylinder.

However, such a prior art solution is not satisfactory because the air left in the inoperative cylinders is repeatedly compressed and expanded every revolution of the engine. Thus, the driving torque is subject to large fluctuations when the inoperative pistons perform intake and exhaust strokes, although the positive and negative driving torques would be small during the same strokes if the cylinders became operative. This, along with the decreased number of operating cylinders, inevitably causes the problem that smooth engine rotation is significantly disturbed due an increase in a primary vibrational component as a result of abnormally large fluctuations of the driving torque generated by the inoperative cylinders.

SUMMARY OF THE INVENTION

It is therefore an object of the present invention to provide a multi-cylinder internal combustion engine which may be operated smoothly under a partially loaded condition.

It is another object of the presnt invention to provide a multi-cylinder internal combustion engine in which some cylinders are made inoperative during the partial load operation, whereby pumping loss is reduced, and an improvement in combustion efficiency and fuel/milage ratio is accomplished.

Briefly described, these and other objects of the present invention are accomplished by the provision of a multi-cylinder internal combustion engine comprising at least one cylinder which can be rendered inoperative while the engine is in the partially loaded condition, at least one cylinder which can continue operating regardless of the engine load condition and controlling means which function during the partial load condition so as to keep the intake valve in the completely closed condition and in turn open the exhaust valve on the exhaust stroke and the intake stroke in the cylinder in the inoperative mode.

Other objects, features and advantages of the present invention will be more apparent from the following description of a prefered embodiment, when considered in connection with the acompanying drawings.

DETAILED DESCRIPTION OF THE PREFERRED EMBODIMENT

Figure 1A:
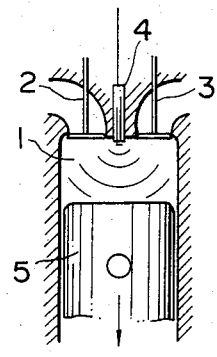
FIGS. 1A, 1B, 1C and 1D are diagrams of the combustion cycle to take place in the multi-cylinder engine in accordance with the present invention when the engine is in a fully loaded condition.
Figure 1B:
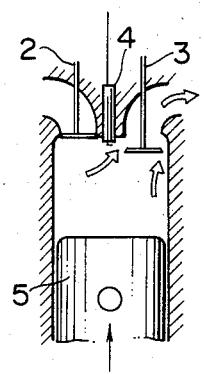
Figure 1C:
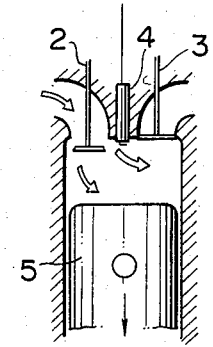
Figure 1D:
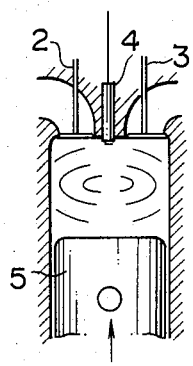
Figure 2A:
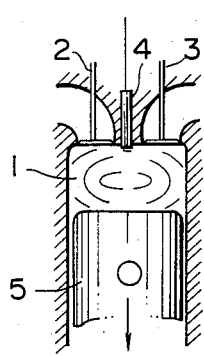
FIGS. 2A, 2B, 2C and 2D are diagrams similar to FIGS. 1A-1D, but showing conditions occuring in a cylinder that is made inoperative.
Figure 2B:
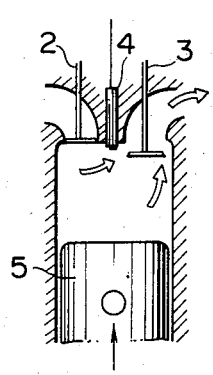
Figure 2C:
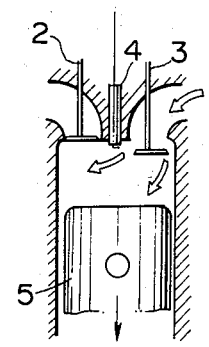
Figure 2D:
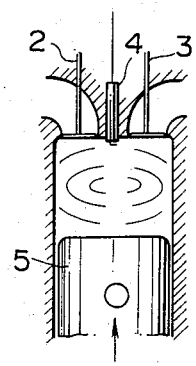

Referring first to FIGS. 1 and 2, there are shown combustion cycles in a multi-cylinder internal combustion engine having e.g., four cylinders in accordance with the present invention. FIG. 1 shows the combustion cycle of the fuel-air mixture in the multi-cylinder engine when the engine receives a heavy load. The alphabetical references, respectively, indicate individual strokes of the four cycles of an engine, namely (a) the expansion stroke, (b) the exhaust stroke, (c) the intake stroke and (d) the compression stroke. After the intake valve 2 and exhaust valve 3 are closed, the fuel-air mixture in the cylinder 1 is ignited by means of an ignition plug 4, forcing the piston 5 downwardly on the combustion and expansion strokes. Immediately after fuel combustion, the exhaust valve 3 is opened for the exhaust stroke, and then the exhaust valve 3 is closd while the intake valve 2 is opened to draw the fuel-air mixture on the intake stroke. Finally, the intake valve 2 is closed to raise the piston 5 upward for effecting the compression stroke.

On the other hand, FIG. 2 shows the cycles of a cylinder in the inoperative mode when the engine is partially loaded. the expansion stroke and the exhaust stroke are the same as shown in FIG. 1, but the intake stroke is different from the previous description in that, as shown in (c) in FIG. 2, the exhaust valve 3 is opened for re-drawing the burned or combustion gas which was discharged to the exhaust tube. Then, the compression stroke (d) in FIG. 2 is effected, wherein the piston 5 is raised upward to compress the combustion gas in the cylinder with the intake valve 2 and the exhaust valve 3 being closed.

As shown in FIGS. 1 and 2, each stroke provides the same operating pattern, that is, Stroke (a) in FIGS. 1 and 2 both provide positive torque, Stroke (d) in FIGS. 1 and 2 negative torque and the other strokes smaller torque. This means that the engine can rotate very smoothly even under the partially loaded condition in the same way as the fully loaded condition.

The operating cylinders can provide only a decreased charging efficiency of the fuel-air mixture while the engine is idling or operated under a small load. During idling operation, for example, the intake air enters the cylinder at an initial pressure of about 400 mm Hg in negative pressure for suction or about 350 to 400 mm Hg in absolute pressure (approximately half the atmospheric pressure), and is compressed, burned and expanded. The peak pressure during combustion is about 10 through 15 kg/cm2.

The torque change comparable with the peak pressure in the operating cylinder can be easily obtained by compressing the exhaust gas having a pressure close to the atmospheric pressure. In addition, as aforementioned, the arrangement in accordance with the present invention enables the inoperative cylinder to undergo a change in internal pressure close to that in the operative mode. For instance, in the case of a four-cylinder engine, the compression and expansion strokes can be obtained two times every revolution of the main shaft of the engine even if two cylinders are in the inoperative mode or condition. As a result, according to a predetermined ignition order, the internal pressure in each cylinder increases in the same sequence as that during the four-cylinder operation, whereby an increase in the bending vibration of the main shaft of the engine can be avoided.

Figure 3:
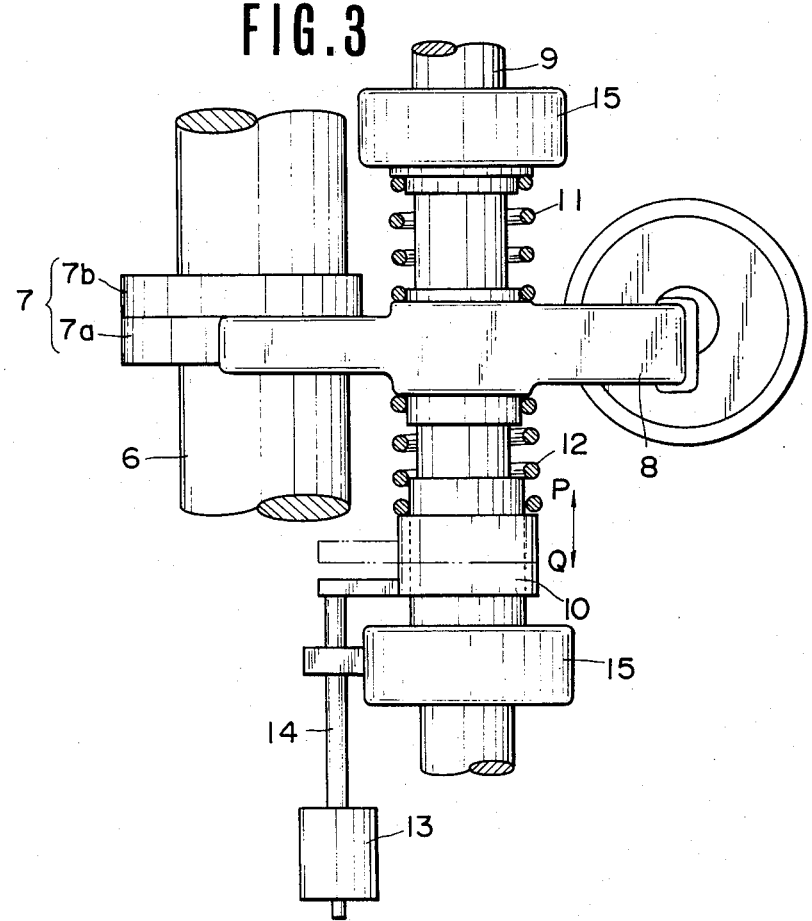
FIG. 3 is a plan view of a driving means for the exhaust valve.
Figure 4:
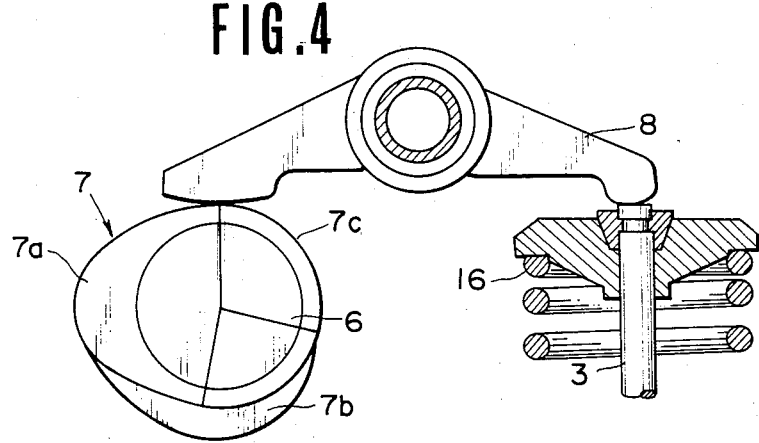
FIG. 4 is a front view of the means shown in FIG. 3.

FIGS. 3 and 4 show a construction of the system for controlling the intake valve 2 and the exhaust valve 3, in accordance with load conditions of the engine, according to the present invention, wherein a cam shaft 6 is provided with cams 7a and 7b having different profiles adjacent to the cam shaft, and a rocker arm 8 is provided to come into driving contact with selectively either of the cams 7a or 7b. The rocker arm 8 is pivotably mounted on the rocker shaft 9 and can be moved along the rocker shaft 9 in the axial direction through springs 11 and 12 by means of a switching ring 10 which is also pivotably mounted on the rocker shaft 9. The movement of the switching ring 10 is controlled by means of a shaft 14 which is linked to an actuator 13. A rocker bracket 15 is mounted on the rocker shaft 9 which is provided at either side of the rocker arm 8. The shaft 14 is axially slidably held at one of the rocker brackets 15. A valve spring 16 is provided to urge the exhaust valve 3 upwardly. The cam 7, rocker arm 8, switching ring 10 and springs 11 and 12 function as controlling means for switching the operative and inoperative modes of the cylinders.

The function of the arrangement in accordance with the present invention wll be described hereinbelow.

The cams 7a and 7b having different profiles are respectively used for the operation of the exhaust valve 3. The cam 7b has a profile such that it can open the exhaust valve 3 on the exhaust stroke as the cam 7a does, and also open the exhaust valve 3 on the intake stroke. The function mentioned above can be also applied to the intake valve 2 except that the profile of the cam 7b for the inoperative mode is in the form of a cam base circle.

While the cam 7a is driving the rocker arm 8, movement of the rocker arm is difficult because of the large reaction forces of the valve spring 16. In this condition, even if the switching ring 10 moves in the direction of the arrow P according to the actuation of the actuator 13, the rocker arm 8 would not move in the same direction only with the spring 12 being compressed.

On the contrary, the reaction forces of the valve spring 16 against the rocker arm 6 decrease when the end of rocker arm 8 comes into contact with the base circle portion 7c of the cam 7a. Accordingly, the operation of the actuator 13 can move the rocker arm 8 in the direction of the arrow P while compressing the spring 11 for bringing the outer perimeter of the cam 7b into contact with the end of the rocker arm 8. On the other hand, in the case of the rocker arm 8 returning back in the reverse direction of the arrow Q, the rocker arm 8 is set to move when the cam 7b reaches the base circle 7c under forces of the spring 11. At this time, if the engine includes four cylinders, the controlling means function to operate two of the intake valves 2 and two of the exhaust valves 3 respectively while keeping the rest of cylinders inoperative. The intake valve 2 and the exhaust valve 3 of the cylinder that continues operating regardless of the engine load conditions are driven by means of a cam having a single profile. Moreover, the actuator 13 is controlled by "ON" and "OFF" operations of a solenoid.

Figure 5:
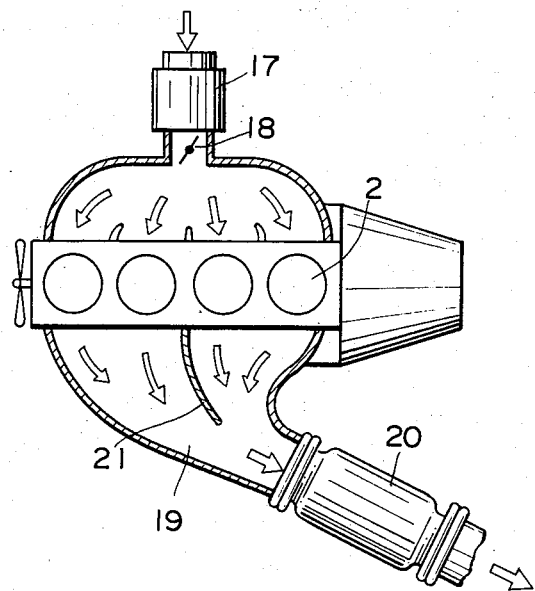
FIG. 5 is a schematic view showing how intake air and exhaust gas flow when all the cylinders in the multi-cylinder engine are operated simultaneously.

In such a manner as aformentioned, the rocker arm 8 is moved in the axial direction in response to the operation of actuator 13 and corresponding to the magnitude of reaction force of the valve spring 16, and by causing the end of rocker arm 8 to come into selective sliding contact with the two cams 7a or 7b, it becomes possible to close the intake valve 2 and open the exhaust valve 3 on the intake stroke for re-drawing the exhaust gas into the combustion chamber, while compression of the combustion gas is carried out by closing the intake valve 2 and the exhaust valve 3 on the compression stroke, thus producing torque change similar to that in the cylinder in the other normal operation and smoothening the rotation of the engine. In this manner as described above, when the engine is operating under the fully loaded condition; the fuel-air mixture is, as shown in FIG. 5, drawn into the four cyhlinders through the carburetor 17 and the throttle valve 18, burned, expanded and finally discharged through the opened exhaust valve 3 into the castalyst 20 through the exhaust tube 19. The partition wall 21 is provided inside the exhaust tube 19 to separate the adjacent two pairs of cylinders.

Figure 6:
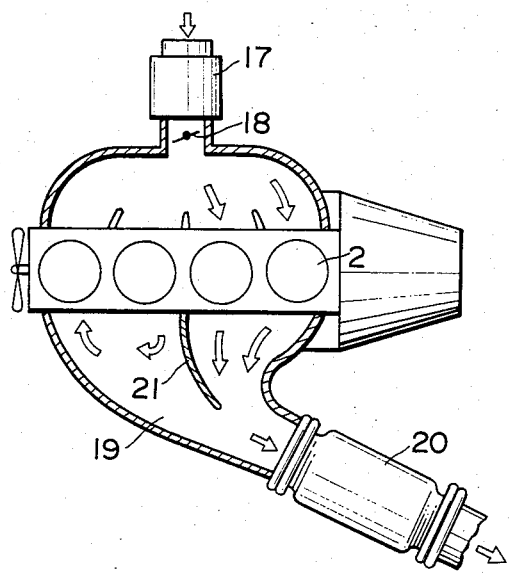
FIG. 6 is a view similar to FIG. 5, but showing how intake air and exhaust gas flow when one cylinder is rendered inoperative.

Moreover, when the engine is operated under the partialy loaded condition, two left-side cylinders are, as shown in FIG. 6, rendered inoperative and the burned or combustion gas is drawn therein on the intake stroke while the remaining cylinders are essentially performing the same function as shown in FIG. 5.

In the foregoing embodiments in accordance with the present invention, four-cylinder engines have been described, however, almost the same effect can be obtained by the six-cylinder engines with three cylinders being rendered inoperative, because the internal pressure change in the cylinders presents the same pattern in both the operative and inoperative modes. Furthermore, igniting sequence of the cylinder is not limited to the embodiment described herein, and is applicable to any ordinary combination thereof.

A switching mechanism for the control of the intake valve and the exhaust valve disclosed herein is merely a proposal of a concrete means, and may be constructed in different means such as hydraulically or electrically driven ones.

As obvious from the foregoing explanation, the multi-cylinder internal combustion engine in accordance with the present invention makes it possible that only the exhaust valve is operable at the cylinder that is rendered inoperative, and that the burned gas is re-drawn from the exhaust passage during the intake stroke and compressed and expanded to develop a torque change similar to that to be produced from the usual engine operation. This may reduce the primary vibrational component and thereby smooth the rotation of the engine under the partially loaded condition, while at the same time improving the combustion efficiency and fuel/milage ratio as a consequence of the controlled number of operating cylinders.

What is claimed is:

1. A multi-cylinder internal combustion engine comprising at least one cylinder having an intake valve and an exhaust valve and being adapted to operate under partially and fully loaded conditions, at least one cylinder having an intake valve and an exhaust valve and being adapted to be inoperative under said partially loaded condition, an axially fixed camshaft, and controlling means which, under said partially loaded condition, continuously closes the intake valve of the inoperative cylinder and periodically opens the exhaust valve of the inoperative cylinder on the exhaust stroke and on the intake stroke of the inoperative cylinder, said controlling means comprising at least four cams having different profiles and fixed to said camshaft and at least two rocker arms each of which is displaceable for selectively contacting one of said cams to control the intake and exhaust valves of the inoperative cylinder, respectively.

2. A multi-cylinder internal combustion engine as claimed in claim 1, in which said controlling means further comprises means for displacing the rocker arms.

3. A multi-cylinder internal combustion engine as claimed in claim 2, including a rocker shaft mounting said rocker arms, and in which each of the rocker arms is slidable in the axial direction of said rocker shaft, the rocker arm displacing means comprising for each rocker arm, an actuator arranged to slide the rocker arm.

4. A multi-cylinder internal combustion engine as claimed in claim 3, in which said controlling means further comprises, for each rocker arm, springs axially mounted on the rocker shaft, a switching ring which is slidably mounted on the rocker shaft and is moved by the actuator to slide the rocker arm through the springs.

5. A multi-cylinder internal combustion engine as claimed in claim 1, wherein said engine comprises a four-cylinder engine in which two cylinders are made inoperative while the rest of cylinders are operating under a partially loaded condition.

6. A multi-cylinder internal combustion engine as claimed in claim 1, wherein said engine comprises a six-cylinder engine in which three cylinders are adapted to be inoperative while the rest of cylinders are operating under a partially loaded condition.

* * * * *